United States Patent Office 3,849,434
Patented Nov. 19, 1974

3,849,434
PROCESS FOR PREPARING TRIAZOLOBENZO-
DIAZEPINES
David Llewellyn Coffen, Glenridge, and Rodney Ian
Fryer, North Caldwell, N.J., assignors to Hoffmann-La
Roche Inc., Nutley, N.J.
No Drawing. Filed July 27, 1973, Ser. No. 383,363
Int. Cl. C07d 53/06, 57/02
U.S. Cl. 260—308 R                                5 Claims

ABSTRACT OF THE DISCLOSURE

A process for preparing triazolobenzodiazepines via the reaction of the corresponding 2-cyano-3H-benzodiazepine with a lower alkanoyl hydrazide is described. The products obtainable by this process are known compounds and are useful as sedatives and tranquilizers.

DESCRIPTION OF THE INVENTION

The present invention relates to a process for preparing known and pharmacologically valuable triazolobenzodiazepines. More particularly, the present invention is concerned with the preparation of 6-phenyl-4H-S-triazolo-[4,3-a]-1,4-benzodiazepines. The end products obtained in employing the inventive process are useful as sedative and tranquilizing agents.

Following the process of the present invention, one can prepare triazolobenzodiazepines of the formula

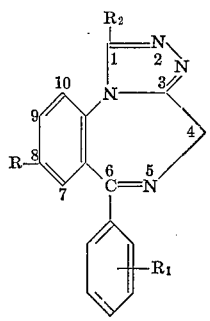

I wherein R is selected from the group consisting of hydrogen, halogen, lower alkyl, trifluoromethyl, nitro, cyano, lower alkoxy, and lower alkylthio; $R_1$ signifies hydrogen or halogen, and $R_2$ signifies hydrogen or lower alkyl.

As used herein, the term "lower alkyl" either a one or in combination refers to straight and branched chain hydrocarbon groups containing from 1 to 7, preferably from 1–4, carbon atoms, such as, for example, methyl, ethyl, propyl, isopropyl, isobutyl, butyl and the like. The term "halogen" refers to all four forms thereof, i.e., bromine, chlorine, fluorine and iodine. The term "lower alkanoyl" includes the acyl residue of lower alkanoic acids, preferably containing from 1 to 4 carbon atoms, for example, formyl, acetyl, propionyl and the like. The term "lower alkoxy" designates straight or branched chain saturated hydrocarbonoxy groups containing from 1 to 7 carbon atoms, preferably from 1 to 4 carbon atoms such as methoxy, ethoxy, propoxy and the like.

In following the novel process of the present invention, the known and useful compounds of formula I above are prepared by reacting a 2-cyano-3H-1,4-benzodiazepine of the formula

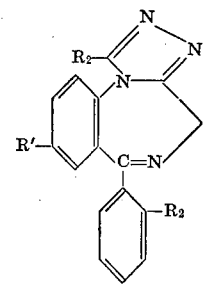

II wherein R and $R_1$ are as described above with a lower alkanoyl hydrazide.

In a preferred aspect of the present invention, R in the starting material of formula II is halogen or nitro, and $R_1$ is located in the ortho position of the 5-phenyl ring; so that by following the novel process of the present invention there is obtained a compound of the formula

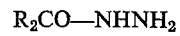

Ia wherein R' signifies halogen or nitro; and $R_1$ and $R_2$ are as described above.

In another preferred aspect, if the $R_2$ substituent is lower alkyl, it is preferably a methyl group; if the R substituent is halogen, chlorine is preferred, while if $R_1$ is halogen, chlorine or fluorine are preferred.

As discussed above, the compounds of formula I above are prepared by reacting a 2-cyano-3H-benzodiazepine of formula II above with a lower alkanoyl hydrazide. The lower alkanoyl hydrazide reactant can be represented by the formula $$R_2CO\text{—}NHNH_2 \qquad\qquad III$$

wherein $R_2$ is as described above. It is obvious from the course of the reaction between the compounds of formulae II and III above that the substituent that will be present in the 1-position of the product of formula I will correspond to the $R_2$ substituent in the formula III compound. Thus, if it is desired to prepare a compound of formula I, unsubstituted in the 1-position, i.e., wherein $R_2$ signifies hydyrogen, then the appropriate benzodiazepine of formula II is reacted with formylhydrazide. Likewise, if a compound of formula I bearing a methyl group in the 1-position is desired, the compound of formula II is reacted with acetylhydrazide. Other suitable lower alkanoyl hydrazides for the purposes of the present invention include propionylhydrazide, butyrylhydrazide and the like.

In reacting the benzodiazepine of formula II with the lower alkanoyl hydrazide of formula III, the hydrazide is first added to a solution of the formula II material. Suitable solvents for this purpose include inert non-nucleophilic organic solvents such as aromatic hydrocarbons, for example, benzene, toluene and xylene; ethers such as tetrahydrofuran; dioxane, dimethoxyethane and the like. Upon addition of the formula III compound to the solution, the reaction mixture is heated to reflux since the reaction between the compounds of formulae II and III proceeds most efficiently at the reflux temperature of the reaction mixture.

The starting materials of formula II above are prepared via the cyanation and subsequent oxidation of the corresponding 3H-1,4-benzodiazepine. Thus, the 3H-1,4-benzodiazepine of the formula

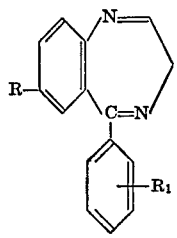

IV wherein R and R₁ are as described above is first converted to the corresponding 2-cyano-2,3-dihydrobenzodiazepine of the formula

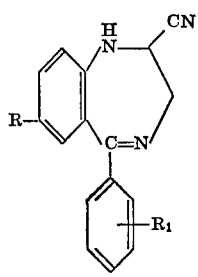

V wherein R and R₁ are as described above.

The conversion of the compound of formula IV to the 2-cyano derivative of formula V may be accomplished by treating said compound with a mixture of an alkali metal cyanide, preferably potassium cyanide, in water, with glacial acetic acid in a suitable solvent-like methanol. The cyanide/glacial acetic acid mixture generates HCN, which acts as the cyanating agent. Thus, this conversion could alternatively be accomplished by adding HCN to a solution of the formula IV compound.

The 2-cyano-2,3-dihydro derivative of formula V so-obtained is then oxidized to the desired compound of formula II. Suitable oxidizing agents for this purpose include manganese dioxide, N-bromosuccinimide (NBS), quinone, chloranil and dichloro-di-cyanoquinone (DDQ), with manganese dioxide being preferred. The oxidation reaction is expediently effected in the presence of an inert, non-nucleophilic organic solvent. Representative of such solvents are aromatic hydrocarbons such as benzene, toluene and xylene; ethers such as tetrahydrofuran; dioxane; dimethoxyethane, and the like. This reaction is effected at temperatures above room temperature, preferably at the reflux temperature of the reaction mixture.

The compounds of formula IV above used as the starting materials in the preparation of the formula II compounds are known or can be prepared in analogy to the preparation of the known compounds.

The following examples are illustrative but not limitative of the present invention. All temperatures are given in degrees Centigrade.

EXAMPLE 1

Preparation of 7-chloro-2-cyano-2,3-dihydro-5-(2-fluorophenyl)-1H-1,4-benzodiazepine A mixture of manganese dioxide (General Metallic Oxides, Type #37) (50 g.) in benzene (500 ml.) was heated and stirred under reflux while collecting water in a Dean-Stark trap. After 1 hour 7-chloro-2,3-dihydro-5-(2-fluorophenyl)-1H-1,4-benzodiazepine (5 g.) and acetic acid (17 ml.) were added and stirring under reflux was continued for an additional hour. T.l.c. analysis of the reaction mixture at this point established that the oxidation was complete. The manganese dioxide was filtered out and washed with a 1:1 mixture of ethanol and methylene chloride. The combined filtrate and washings were washed with aqueous sodium carbonate solution and with water, dried and evaporated to leave an oily residue.

The crude manganese dioxide oxidation product from 30 g. of 7-chloro-2,3-dihydro-5-(2-fluorophenyl)-1H-1,4-benzodiazepine prepared as described above, was taken up in tetrahydrofuran (100 ml.) and treated with a solution of potassium cyanide (19 g.) in water (40 ml.). A solution of acetic acid (22 ml.) in methanol (66 ml.) was added to the resulting mixture during the course of 5 min. This solution was then stripped of solvent under reduced pressure and the residue partitioned between methylene chloride and water. The methylene chloride layer was extracted with 10% hydrochloric acid and discarded. The acid extract was made basic with aqueous potassium hydroxide and extracted with methylene chloride. The residue from this extract after drying and evaporation was crystallized from methylene chloride/cyclohexane to give the above-named product as pale yellow crystals, m.p. 163–164°.

EXAMPLE 2

Preparation of 7-chloro-2-cyano-2,3-dihydro-5-phenyl-1H-1,4-benzodiazepine

A stirred solution of crude 7-chloro-5-phenyl-3H-1,4-benzodiazepine obtained from the oxidation of 7-chloro-2,3-dihydro-5-phenyl-1H-1,4-benzodiazepine (128 g.) with manganese dioxide in THF (500 ml.) was cooled in a water bath with simultaneous addition of the following solutions: (a) potassium cyanide (88 g.) in water (180 ml.) and (b) glacial acetic acid (100 ml.) in methanol (300 ml.). The resulting mixture was stirred for 30 minutes after completion of the additions and then concentrated to about 400 ml. under reduced pressure during which the product began to separate. Crystallization of the crude product was completed by dilution with 2 l. of water and chilling. The solid was collected and recrystallized from methylene chloride/cyclohexane mixture to give the above-named product as pale yellow crystals, m.p. 181–183° (dec.).

EXAMPLE 3

Preparation of 7-chloro-2-cyano-5-phenyl-3H-1,4-benzodiazepine

Manganese dioxide (25 g.) slurried in benzene (250 ml.) was stirred and heated under reflux for 1 hour while collecting water in a Dean-Stark trap. 7-Chloro-2-cyano-2,3-dihydro-5-phenyl-1H-1,4-benzodiazepine (5 g.) was added and stirring with reflux continued for 16 hours. The solid was filtered and washed with methylene chloride. The filtrate and washings were evaporated to a yellow oil which was taken up in ether giving the above-named product as pale yellow crystals, m.p. 151–154°.

EXAMPLE 4

Preparation of 8-chloro-1-methyl-6-phenyl-4H-S-triazolo[4,3-a]-1,4-benzodiazepine The benzene solution containing 25 g. of 7-chloro-2-cyano-5-phenyl-3H-1,4-benzodiazepine prepared as described in Example 3 above, was treated with acetylhydrazide (10 g.) and concentrated by boiling to about 300 ml. during 2 hours. The remaining solvent was removed under reduced pressure and replaced by 1-butanol (250 ml.). This solution was heated under reflux for 16 hours and then concentrated under reduced pressure causing the product to crystallize in a brown paste. Trituration with ether, filtering, washing with water and then more ether gave the above-named product as a light tan crystalline solid, m.p. 227–230°.

We claim:
1. A process for the preparation of a compound of the formula

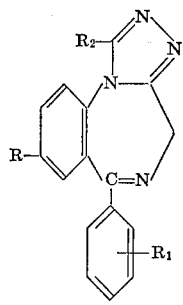

wherein R is selected from the group consisting of hydrogen, halogen, lower alkyl, trifluoromethyl, nitro, cyano, lower alkoxy and lower alkylthio; $R_1$ signifies hydrogen or halogen; and $R_2$ signifies hydrogen or lower alkyl comprising reacting a compound of the formula

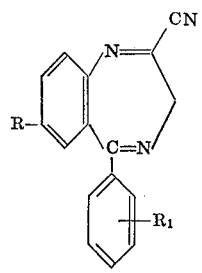

wherein R and $R_1$ are as described above with a compound of the formula $$R_2—CO—NHNH_2$$

wherein $R_2$ is as described above.

2. The process of claim 1 wherein R signifies halogen or nitro.
3. The process of claim 2 wherein R signifies chlorine.
4. The process of claim 1 wherein $R_2$ signifies methyl.
5. The process of claim 1 wherein the reaction is effected at the reflux temperature of the reaction mixture.

References Cited
FOREIGN PATENTS
6916543  5/1970  Netherlands _____ 260—308 R
7015430  4/1971  Netherlands _____ 260—308 R ALTON D. ROLLINS, Primary Examiner U.S. Cl. X.R.
260—239 BD